(12) United States Patent
Fallis, III et al.

(10) Patent No.: US 7,469,954 B2
(45) Date of Patent: Dec. 30, 2008

(54) MANUALLY REMOVED COVER AND ARTICULATED COVER SUPPORTS FOR A VEHICLE

(75) Inventors: Robert E. Fallis, III, Rochester, MI (US); Michael T. Willard, Harrison Township, MI (US); Robert D. Wiechowski, Warren, MI (US)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 355 days.

(21) Appl. No.: 11/293,453

(22) Filed: Dec. 2, 2005

(65) Prior Publication Data

US 2006/0119131 A1   Jun. 8, 2006

Related U.S. Application Data

(60) Provisional application No. 60/633,092, filed on Dec. 3, 2004.

(51) Int. Cl.
*B60J 7/12* (2006.01)
(52) U.S. Cl. .................... 296/107.09; 296/105; 296/109
(58) Field of Classification Search ............ 296/107.09, 296/107.03, 107.02, 103, 105, 109, 102
See application file for complete search history.

(56) References Cited

U.S. PATENT DOCUMENTS

| | | | |
|---|---|---|---|
| 960,338 A * | 6/1910 | Keil et al. ................ | 135/88.02 |
| 1,191,446 A * | 7/1916 | McGregor ............ | 296/107.09 |
| 2,460,399 A | 2/1949 | Schassberger | |
| 2,463,646 A | 3/1949 | Schassberger | |
| 2,620,224 A | 12/1952 | Hedley | |
| 2,682,427 A | 6/1954 | Bright | |
| 3,167,349 A | 1/1965 | Young et al. | |
| 4,179,152 A | 12/1979 | Kent, Jr. | |
| 4,260,188 A | 4/1981 | Bauer | |
| 4,600,235 A | 7/1986 | Frederick et al. | |
| 4,730,870 A | 3/1988 | DeRees | |
| 4,733,902 A | 3/1988 | Rabb | |
| 4,757,854 A | 7/1988 | Rippberger | |
| 4,850,634 A | 7/1989 | Taubitz | |
| 5,299,850 A | 4/1994 | Kaneko et al. | |
| 5,560,671 A | 10/1996 | Ojanen et al. | |
| 5,673,959 A | 10/1997 | Padlo | |
| 5,673,959 A | 10/1997 | Padlo | |
| 5,702,147 A | 12/1997 | Essig | |
| 5,803,529 A | 9/1998 | Perry-Bores | |
| 5,829,195 A | 11/1998 | Ojanen | |
| 5,947,546 A | 9/1999 | Hilliard et al. | |
| 5,979,969 A | 11/1999 | Hilliard et al. | |
| 5,992,917 A | 11/1999 | Hilliard et al. | |
| 6,036,256 A | 3/2000 | Hilliard et al. | |
| 6,068,326 A * | 5/2000 | Shiromura ............... | 296/120.1 |
| 6,073,989 A | 6/2000 | Hilliard et al. | |
| 6,189,962 B1 | 2/2001 | Henderson | |

(Continued)

*Primary Examiner*—Jason S Morrow
(74) *Attorney, Agent, or Firm*—Brooks Kushman P.C.

(57) ABSTRACT

A removable top assembly for a vehicle and method of providing a removable top cover for a vehicle is provided. The removable top assembly includes a fabric cover over a frame. The frame includes a rear bow that is pivotally connected on opposite sides to side rails and a C-pillar. A one bow is latched to a fixed transverse beam. A two bow is detachably secured to right and left side rails that are in turn attached to right and left fixed side beams of the vehicle.

19 Claims, 4 Drawing Sheets

U.S. PATENT DOCUMENTS

| | | |
|---|---|---|
| 6,286,888 B1 | 9/2001 | Essig |
| 6,295,713 B1 | 10/2001 | Hilliard et al. |
| 6,309,007 B1 | 10/2001 | Essig et al. |
| 6,409,248 B1 | 6/2002 | Bores |
| 6,439,643 B2 | 8/2002 | Barker |
| 6,588,824 B2 | 7/2003 | Neubrand |
| 6,866,322 B2 * | 3/2005 | Willard ................. 296/107.01 |
| 7,240,960 B2 * | 7/2007 | Fallis et al. ................. 296/218 |

* cited by examiner

MANUALLY REMOVED COVER AND ARTICULATED COVER SUPPORTS FOR A VEHICLE

CROSS-REFERENCE TO RELATED APPLICATIONS

This application claims the benefit of U.S. provisional application Ser. No. 60/633,092 filed Dec. 3, 2004.

BACKGROUND OF THE INVENTION

1. Field of the Invention

The present invention relates to a manually removed convertible top for a motor vehicle.

2. Background Art

Convertible tops are generally of the retractable hard top type or of the soft top type. Convertible tops are generally designed to encompass the entire roof of a sedan or coupe style vehicle.

Sport utility vehicles ("SUVs") generally have a permanent roof that extends from the windshield header to the rear window. The rear window may be part of, or cooperate with, a lift gate or tail gate. Some SUVs may have a permanent roof which extends from the front windshield to the middle section of the vehicle leaving the entire rear compartment uncovered. Removable hard tops and zip-on or snap-on soft tops have been developed for SUVs to cover the open cargo area. However, prior art removable tops tend to be difficult to remove and attach to the vehicle. Storage of removable hard tops and soft tops is also a problem.

One objective of this invention is to provide a soft top system which is easily removed from, and attached to, a vehicle. Many removable soft top systems have supports that are complex to assemble and include many similar parts that must be assembled in a particular arrangement and order. This makes it difficult to determine the exact placement of each of the supports because they are detached from one another when removed from the vehicle. These systems require a series of connections and an arrangement of supports and bows that are not intuitive to assemble. A complex set of instructions must be followed step-by-step to attach and detach the soft top system. Many soft top systems also have ineffective fastening systems for securing the soft top cover. Some have zippers that stick, snaps that break, or even velcro connections that are wholly ineffective. There is a need for a soft top system that is easily installed on the vehicle while limiting the number of fastening locations that are prone to failure.

Another objective of this invention is to provide a soft top that may be neatly and compactly stowed in the rear storage compartment of the vehicle. Many removable soft top systems are not designed for effective storage in a vehicle. These tops may wrinkle or be soiled when stored in their designated storage space. Further, many are difficult to orient for effective storage in the rear compartment of the vehicle. There is a need for a soft top system that may be easily and effectively stowed in the vehicle.

There is a need for an easy to use, vehicle stored, convertible top for SUVs. The above problems and needs are addressed by Applicants' invention as summarized below.

SUMMARY OF THE INVENTION

According to one aspect of the present invention, a removable top assembly for a vehicle is provided. The vehicle has a fixed transverse beam and right and left longitudinally extending fixed side beams. The top assembly comprises a fabric cover and a support frame. The support frame comprises a transversely extending removable rear bow that supports the fabric cover at the top rear of the vehicle. Right and left rear supports are secured to opposite lateral ends of the rear bow for supporting the rear bow when the cover assembly is attached to the vehicle. A right side rail and a left side rail are secured to the right and left fixed side beams on a forward end and a are secured to the right rear support and left rear support on a back end. An intermediate bow is secured to the right and left rails and, is disposed between and parallel to the fixed transverse beam and the rear bow.

According to other aspects of the invention as it relates to the removable cover, each end of the rear supports has an upper link and a lower link that are connected to each other by pivot joint. The upper and lower links are aligned when the top cover assembly is attached to the vehicle. The upper and lower links are selectively pivoted to an angular orientation relative to each other to reduce the tension applied to the top cover assembly by the rear supports.

An upper end of each of the rear supports is pivotally connected to the rear bow and the side rails are pivotally connected to the rear bow. The rear supports are secured to the rear bow by a pivot connection so that the rear supports may pivot inwardly to a position parallel to the rear bow. Similarly, the side rails are secured to the rear bow by a pivot connection so that the side rails may pivot inwardly to a position that is also parallel to the rear bow. The side rails may have an end portion that is received in a receptacle that is attached or associated with one of the fixed side beams.

According to another aspect of the invention, the intermediate bow may have a side rail received on each of its opposite lateral ends that can be used to secure the intermediate bow to the side rails. The intermediate bow may be completely detached from the side rails when the top cover assembly is detached from the vehicle.

A removable cover may be further comprise a forward bow to which the front edge of the cover is secured. The forward bow is selectively attached to the fixed transverse beam when the top cover assembly is attached to the vehicle. At least one latch is provided for securing the forward bow to the fixed transverse beam.

According to another aspect of the invention, a tailgate beam may be secured to a rear lower edge of the cover. The tailgate beam is assembled to a top edge of a tailgate of the vehicle when the top cover is attached to the vehicle.

The removable cover may further comprise a rear light and right and left side lights that are removably secured to the cover. The side lights each cover an area between one of the fixed side rails one of the rear supports and a rear quarter panel of the vehicle. The rear light covers an area between the two rear supports, the rear bow and the tailgate of the vehicle.

According to another aspect of the invention, the rear supports and side rails may be pivoted to a position parallel to the rear bow while remaining connected to the rear bow. The intermediate bow is detached from the side rails. The cover is folded and stored in a container with the rear supports, side rails, rear bow, and intermediate bow.

According to another aspect of the present invention, a method of providing a removable cover for a vehicle is provided. The removable roof includes a cover assembly including a top portion and a frame. The top portion is supported by the frame that includes a one bow, a two bow, a three bow, a C-pillar and side rails. The vehicle has a right fixed side beam, a left fixed side beam, and a fixed transverse beam that extends transversely across the vehicle above the passenger compartment. The method of the invention comprises releasing tension applied by the C-pillar to the cover assembly and detaching the top portion from the base of the C-pillar. The one bow is unlatched from the fixed transverse beam. The two and three bows are detached from the top portion of the cover assembly. The side rails are detached from the fixed side beams and are pivoted to a position that is parallel to the three bow. The two bow is detached from the side rails as the side rails are pivoted. The C-pillars are pivoted to a position that is parallel to the three bow. The one, two and three bows are stored with the side rails and C-pillar along with the top portion of the vehicle. The C-pillar and side rails are attached to the three bow.

According to other aspects of the method of the present invention, a pair of side curtain windows and a back light panel are provided as part of the cover assembly and the method further comprises detaching the side curtain windows and back light panel from the top portion.

Other aspects of the method may include rolling the top portion around the one bow prior to storage. Further, the vehicle may have a tailgate and the frame may further comprise a four bow that is assembled to the tail gate wherein the method further comprises removing the four bow from the tailgate. The tailgate may be opened before releasing the tension applied by the C-pillar to the cover.

The method may further comprise reattaching the frame to the vehicle by pivoting the C-pillar outwardly to a vertical position relative to the three bow and securing the C-pillar to the vehicle. The side rails may then be pivoted outwardly to a longitudinally extending position and each of the side rails may be secured to one of the fixed side beams. The two bow may then be secured to the side rails. The top portion may be reattached to the two bow and three bow. The cover is clipped to the base of the C-pillar. The one bow may be latched to the fixed transverse beam with the re-attachment being completed by applying tension with the C-pillar to the cover assembly.

The method may further comprise attaching the four bow to the top portion and tailgate before applying tension to the cover by the C-pillar.

A convertible top for an SUV is provided that may be easily and neatly stored in the rear cargo area of the vehicle. The convertible top comprises a flexible fabric top that is secured to several retaining members that support the top when it is attached to the vehicle. The retaining members are articulated with special pivots and connectors that facilitate storage in a confined space.

In one embodiment of the invention, the retaining member system is fitted to sports bars or side rails of the vehicle (hereinafter "sports rails/side bars") and may have specially configured side rails and bows for supporting the top cover. The canvas top, supports, and bows may be easily removed and compactly stowed in the rear cargo area of the vehicle.

The first bow may have ends that rest on the permanent rails of the vehicle. The first bow also may have clips that are attached to a transversely extending beam of the vehicle. The canvas top may be permanently or detachably fixed to the first bow. The second bow has ends that align with permanently installed rails on the vehicle. The second bow may have interlocking ends that snap on to side rails to hold the side rails in longitudinal alignment with the sports rails/side bars.

The side rails have a forward end that is received by a receptacle on top of the sports bars/side rails of the vehicle. The ends of the side rails located closest to the rear of the vehicle are connected to pivot connectors that allow the side rails to rotate from a longitudinal orientation to a transverse orientation with the side rails being aligned with the three bow. A pair of support links are connected to opposite ends of the three bow by a pivot stub shaft that is attached to the offset upper ends of the support links. The support links and the side rails are aligned with the three bow for easy storage.

According to another feature of the invention, removable windows may be provided on the side portions of the convertible top as well as in the rear section. The removable windows may be attached with zippers, velcro, or another removable attachment system.

These and other objects and advantages of the present invention will be readily understood by one of ordinary skill in the art upon review of the attached drawings in light of the following detailed description of an embodiment of the SUV soft top system of the present invention.

DETAILED DESCRIPTION OF THE PREFERRED EMBODIMENT(S)

Figure 1:
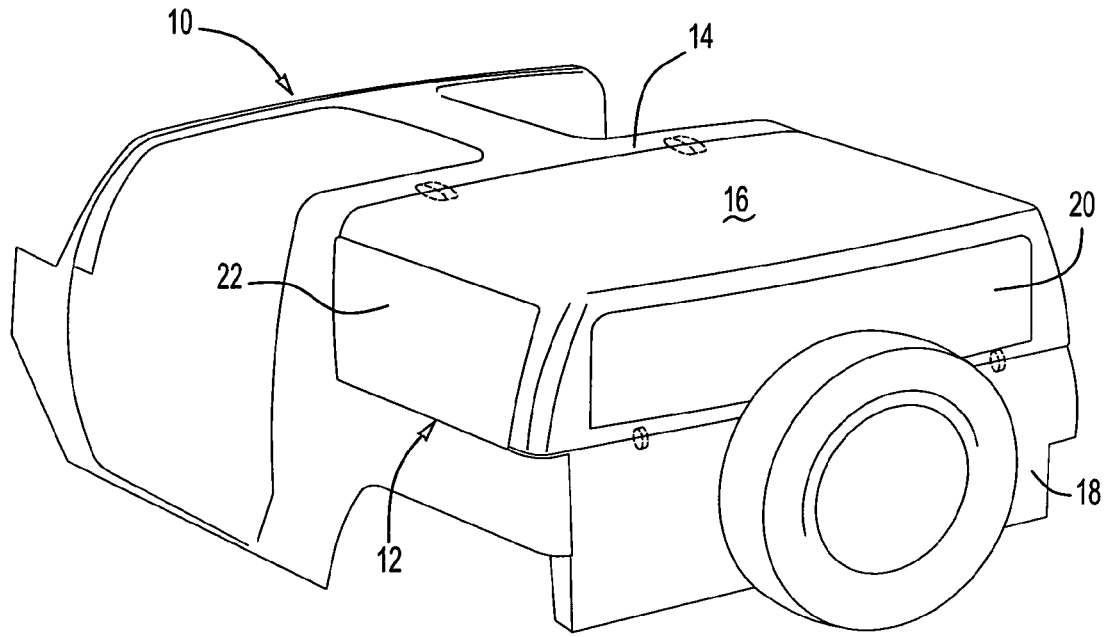
FIG. 1 is a fragmentary perspective view of a portion of the body of a sport utility vehicle having a removable soft top rear compartment cover.

Referring to FIG. 1, a sport utility vehicle 10 is partially illustrated with a particular focus on a rear compartment 12. A transverse beam 14 forms part of the vehicle 10 at the forward and upper portion of the rear compartment 12. A removable cover 16 extends from the transverse beam 14 to a tailgate 18. A rear light 20 and rear side lights 22 are preferably plastic side curtain windows that may be secured by zippers, snaps or velcro fasteners to the removable cover 16.

Figure 2:
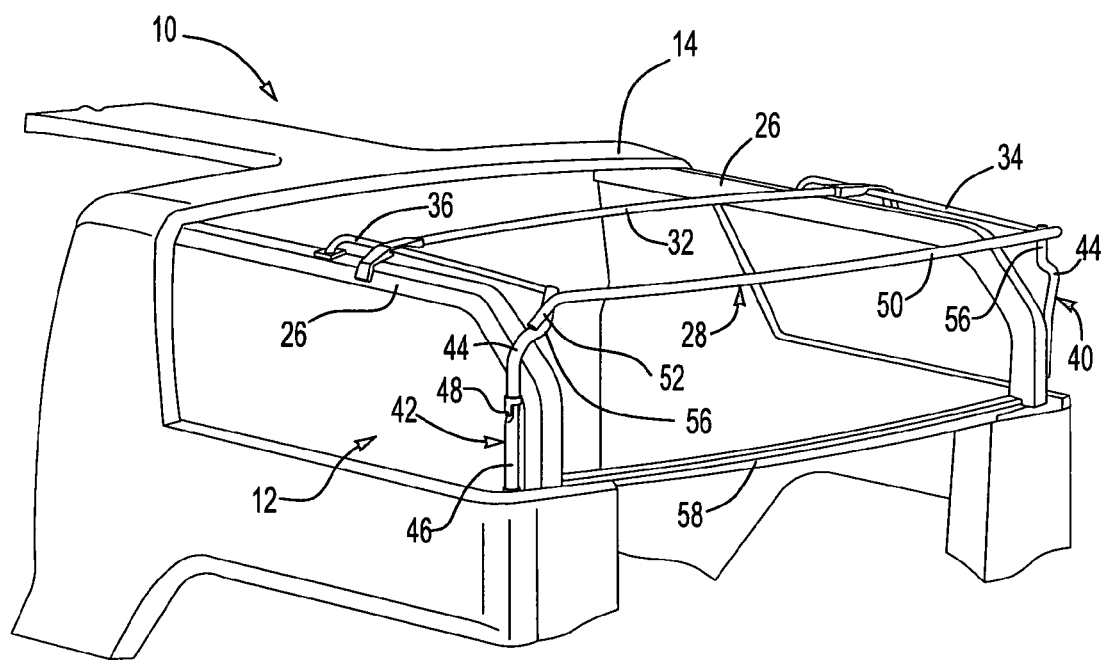
FIG. 2 is a fragmentary perspective view of a vehicle having a removable frame for supporting a soft top cover.
Figure 3:
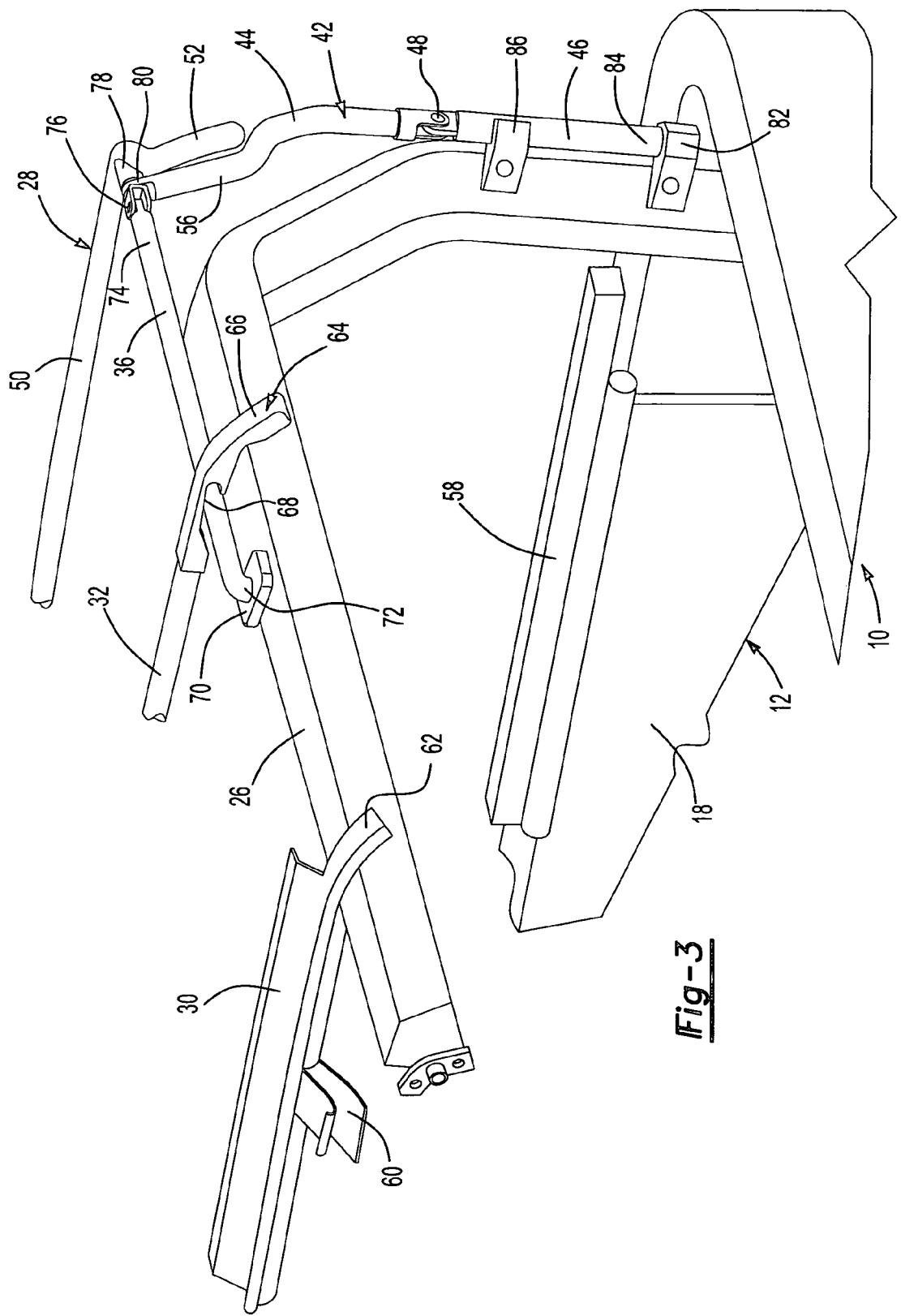
FIG. 3 is a fragmentary perspective view of portions of the removable frame for a soft top cover for the rear compartment of a sport utility vehicle.

Referring to FIGS. 2 and 3, the rear compartment 12 of the vehicle 10 is shown with the cover 16 removed. Sports rails/side bars 26 are provided on opposite sides of the rear compartment 12 that extend generally from the transverse beam 14 to the tailgate 18. An articulated top frame is generally indicated by reference numeral 28. The articulated top frame 28 includes a one bow 30 shown in FIG. 3 and a two bow 32 that is shown in FIGS. 2 and 3. Right and left side rails 34 and 36 extend parallel to the sports bars/side rails 26 to right and left rear supports 40 and 42.

Right and left rear supports 40 and 42 each include an upper link 44 and a lower link 46. A pivot joint 48 may be a clevis-type joint that interconnects the upper link 44 to the lower link 46. The pivot joint 48 tensions the top cover 16 in the area of the rear corners of the top 16.

A three bow 50 is provided at the upper rear portion of the rear compartment 12. Three bow 50 has curved corner ends 52 that define the rear corners of the rear compartment and support the removable cover 16 in the area of the rear corners. The upper links 44 each have an offset upper portion 56 that jogs inboard of the curved corner ends 52 of the three bow 50. A backlight/tailgate beam 58 is attached to the removable cover 16 at the top edge of the tailgate 18. The backlight/tailgate beam 58 secures the removable cover 16 to the tailgate 18.

Referring now more specifically to FIG. 3, at least one latch 60 is provided on the one bow 30. Latch 60 secures the one bow 30 to the transverse beam 14. The one bow 30 has a curved end portions 62 that overlie the sports bars/side rails 26 interfacing the one bow 30 with the sports bars/side rails 26.

The two bow 32 is provided with end attachments 64 at its opposite ends. Each end attachment 64 of the one bow 32 has a contoured portion 66 that overlies and interfaces with the sports bars/side rails 26. The end attachment 64 also define a side rail receiver 68. The side rail receivers 68 on each end of the two bow 32 each engage one of the left and right side rails 34 and 36.

The side rails 34 and 36 are each connected to the sports bars/side rails 26 by a side rail cup 70. The side rail cup 70 is assembled to the sports bars/side rails 26 and receive a end portion of a side rail 34, 36. In FIG. 3, the left side rail 36 is shown with its end portion 72 being received in the side rail cup 70. A back end 74 of the left side rail 36 is connected by a clevis pivot connector 76. A stub shaft 78 extends forwardly from the three bow 50. The back end 74 of the left side rail 36 is connected to the clevis pivot connector 76. The clevis pin connector 76 is connected through an eyelet end 80 of the upper link 44 of the left rear support 42. The clevis pivot connector 76 is connected by a fastener through the eyelet end 80 to the stub shaft 78.

A pivot cup 82 is provided at the lower end 84 of each of the lower links 46. The lower end 84 is received in the pivot cup 82 to secure the lower link 46 to the fixed side rail 26. A tension lock 86 receives an intermediate portion of the lower link 46 to hold it in a generally vertical orientation and in alignment with the upper link 44 of the left rear support 42. The right rear support 40 is constructed and supported in the same manner.

Figure 4:
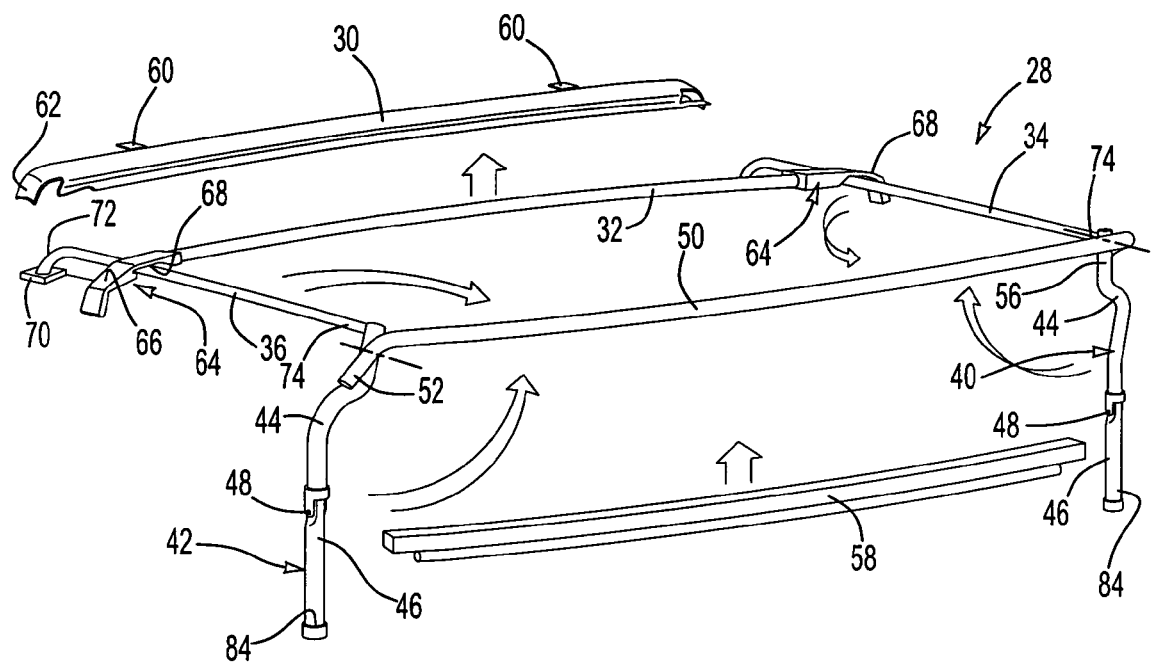
FIG. 4 is a diagrammatic perspective view of a soft top cover support frame.

Referring to FIG. 4, the articulated top frame 28 is shown in isolation with arrows indicating the direction of movement of the elements of the articulated top frame 28 as it is folded to its retracted, or storage, position. The articulated top frame 28 is initially removed by moving the pivot joint 48 from the aligned position in which tension is applied to the soft top to an non-aligned orientation that releases tension from the soft top cover 16 that is applied by the rear supports 40 and 42 to the three bow 50. At this point the top 16 is loosely connected to the bow 32, three bow 50 and tailgate beam 58. The cover 16 is then unclipped from the base of the right and left rear supports 40 and 42. The clip may be a plastic clip that secures a lower edge of the top near the lower end 84 of the lower link 46 in acute angular orientation.

The one bow 30 is then unlatched from the transverse beam 14. The latch 60 is connected to the forward section of the roof is a J-shaped latch member that is attached to the transverse beam 14 and hooks behind the one bow 30. Two latches are preferably provided for securing the one bow to the transverse beam 14. The number two bow 32 and number three bow 50 are secured to the removable cover 16 by fabric straps having hook and loop fastener strips. The fastener strips may be separated to allow the cover 16 to be removed from the number two bow 32 and number three bow 50. The cover fabric may then be rolled up around the one bow 30.

The side rails 34 and 36 have end portions 72 that extend in a downward direction and are received in the side rail cup 70 on the sports bars/side rails 26. The side rails 34 and 36 are rotated inwardly from a longitudinally extending position to a transversely extending position parallel to the three bow 50.

As the side rails 34 and 36 are pivoted together the number two bow 32 is released and separated from the remainder of the articulated top frame 28. The rear supports 40 and 42 are then rotated inwardly and upwardly from their vertical position to a position in which they are parallel to the number three bow 50. The backlight/tailgate beam 58 may then be removed from the top of the tailgate 18.

Figure 5:
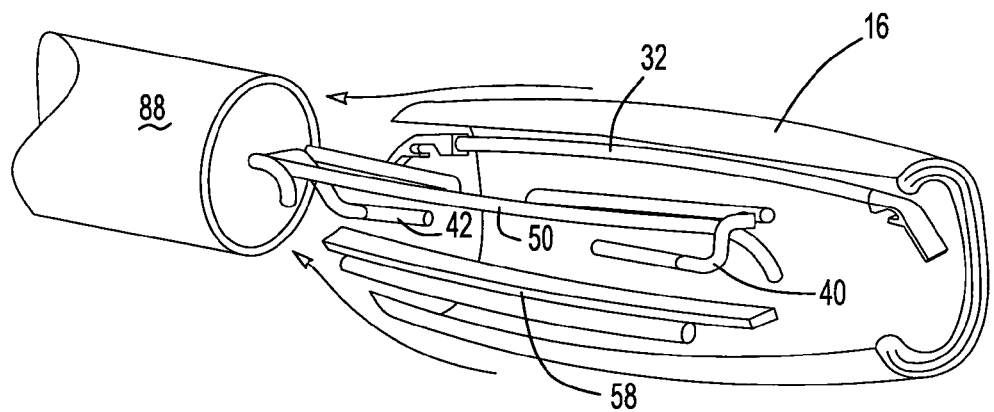
FIG. 5 is a perspective view showing a soft top cover and its support frame oriented to be stowed in a cylindrical container.

Referring to FIG. 5, the storage of removable cover in articulated top frame 28 is illustrated. A storage tube 88 is provided for storing the component parts. The storage tube 88 may be a rigid tube or may be a flexible storage back.

The rear light 20 and rear side lights 22 may be rolled or folded by being placed in the stored tube 88. The top cover is then rolled around the one bow 30 and the two bow 32, three bow 50 and tailgate beam 58 are folded and may be inserted in the storage tube 88 or adjacent to the top cover 16. The rear light 20 and rear side lights 22 are unzipped from the removable cover 16 before the cover is removed from the top frame 28.

Figure 6:
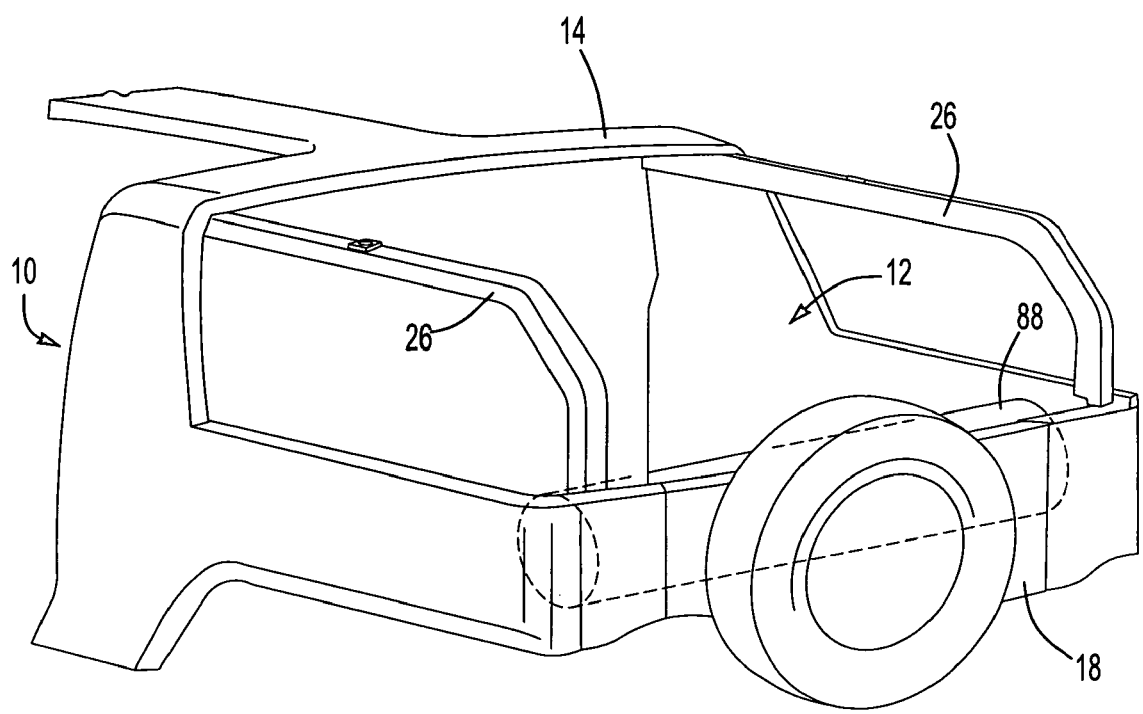
FIG. 6 is a fragmentary perspective view of a sport utility vehicle rear compartment with a soft top cover and the supporting frame removed from the vehicle and stored in the cylindrical container.

As shown in FIG. 6, the storage tube 88 with the removable cover 16 and articulated top frame 28 stored within the back of the rear compartment 12 adjacent to the tailgate 18. In this way the entire soft top structure may be conveniently and compactly stored in a rear compartment 12.

The removable cover 16 may be redeployed by reversing the assembly steps described above with reference to FIG. 4. Assembly steps are relatively simple and straightforward due to the fact that the side rails 34 and 36, three bow 50 and right and left rear supports 40 and 42 remain connected together by means of the articulated pivoting joints. The other components are constructed to be intuitively assembled in only one way to assure proper assembly of the rear compartment cover.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A removable top assembly for a vehicle, the vehicle having a fixed transverse beam and right and left longitudinally extending fixed side beams, the top assembly comprising:
   a fabric cover;
   a transversely extending removable rear bow supporting the fabric cover at the top rear of the vehicle;
   a right rear support and a left rear support that are secured to opposite lateral ends of the rear bow to support the rear bow when the top assembly is attached to the vehicle, wherein each of the rear supports are secured to the rear bow by a pivot connection so that the rear supports pivot inwardly to a position parallel to the rear bow;
   a right side rail and a left side rail that are secured respectively to the right and left fixed side beams on a forward end and that are secured respectively to the right rear support and the left rear support on a back end; and
   an intermediate bow that is secured to the right and left side rails, the intermediate bow being disposed between and parallel to the fixed transverse beam and the rear bow.

2. The removable top assembly of claim 1 wherein each of the rear supports has an upper link and a lower link that are connected to each other by a pivot joint, wherein the upper and lower links are aligned when the top assembly is attached to the vehicle and wherein the upper and lower links are selectively pivoted to an angular orientation relative to each other to reduce the tension applied to the top assembly by the rear supports.

3. The removable top assembly of claim 1 wherein an upper end of each of the rear supports is pivotally connected to the rear bow and the side rails are pivotally connected to the rear bow.

4. The removable top assembly of claim 1 wherein the side rails are secured to the rear bow by a pivot connection so that the side rails pivot inwardly to a position parallel to the rear bow.

5. The removable top assembly of claim 1 wherein the side rails each have an end portion that is received in a receptacle that is attached to one of the fixed side beams.

6. The removable top assembly of claim 1 wherein the intermediate bow has a side rail receiver on opposite lateral ends that can be used to secure the intermediate bow to the side rails.

7. The removable top assembly of claim 1 further comprising a forward bow to which a front edge of the cover is secured, the forward bow being selectively attached to the fixed transverse beam when the top assembly is attached to the vehicle.

8. The removable top assembly of claim 7 further comprising at least one latch for securing the forward bow to the fixed transverse beam.

9. The removable top assembly of claim 1 wherein the intermediate bow is completely detached from the side rails when the top assembly is detached from the vehicle.

10. The removable top assembly of claim 1 further comprising a tailgate beam that is secured to a rear lower edge of the cover and a top edge of a tailgate of the vehicle when the top assembly is attached to the vehicle.

11. The removable top assembly of claim 1 further comprising a rear light and right and left side lights that are removably secured to the cover, wherein the side lights each cover an area between one of the fixed side rails, one of the rear supports and a rear quarter panel of the vehicle, and wherein the rear light covers an area between the two rear supports, the rear bow and a tailgate of the vehicle.

12. The removable top assembly of claim 1 wherein the rear supports and side rails may be pivoted to a position parallel to the rear bow while remaining connected to the rear bow, and wherein the intermediate bow is detached from the side rails, and further wherein the cover is folded and stored in a container with the rear supports, side rails, rear bow, and intermediate bow.

13. A method of providing a removable roof for a vehicle, the removable roof including a top assembly including a cover portion and a frame, the cover portion being supported by the frame that includes a one bow, a two bow, a three bow, a C-pillar and side rails, the vehicle having a right fixed side beam, a left fixed side beam, and a fixed transverse beam that extends transversely across the vehicle above a passenger compartment, the method comprising:

releasing tension applied by the C-pillar to the top assembly and detaching the cover portion from the base of the C-pillar;

unlatching the one bow from the fixed transverse beam;

detaching the two bow and the three bow from the top portion;

detaching the side rails from the fixed side beams and pivoting the side rails to a position that is parallel to the three bow;

detaching the two bow from the side rails while pivoting the side rails;

pivoting the C-pillars to a position that is parallel to the three bow; and stowing the one bow, two bow and three bow with the side rails and C-pillar attached thereto with the cover portion in the vehicle.

14. The method of claim 13 wherein the removable roof further comprises a pair of side curtain windows and a back light panel, and the method further comprises detaching the side curtain windows and back light panel from the top portion.

15. The method of claim 13 further comprising rolling the top portion around the one bow.

16. The method of claim 13 wherein the vehicle has a tailgate and the frame further comprises a four bow that is assembled to the tail gate and wherein the method further comprises removing the four bow from the tailgate.

17. The method of claim 16 wherein the tailgate is opened before releasing the tension applied by the C-pillar to the cover.

18. The method of claim 13 further comprising:

reattaching the frame to the vehicle by pivoting the C-pillar outwardly to a vertical position relative to the three bow and securing the C-pillar to the vehicle, pivoting the side rails outwardly to a longitudinally extending position and securing each of the side rails to one of the fixed side beams, and securing the two bow to the side rails;

reattaching the top portion to the two bow and the three bow and clipping the cover to the base of the C-pillar;

latching the one bow to the fixed transverse beam; and applying tension with the C-pillar to the cover assembly.

19. The method of claim 18 further comprising attaching a four bow to the top portion and a tail gate before applying tension to the cover assembly by the C-pillar.

* * * * *